Patented July 6, 1937

2,086,311

UNITED STATES PATENT OFFICE 2,086,311

5,5-CYCLOHEXENYLALKYLHYDANTOINS AND THEIR MANUFACTURE

August Binkert, Basel, Switzerland, assignor to the firm of Chemical Works, formerly Sandoz, Basel, Switzerland No Drawing. Application September 25, 1935, Serial No. 42,139. In Switzerland October 8, 1934

12 Claims. (Cl. 260—124)

The present invention relates to the production of 5.5-cyclohexenylalkylhydantoins which are new compounds suitable for therapeutical purposes.

It has been found that by treating cyclohexenylalkylcyanoacetic- and -malonic acid derivatives of the general formula:

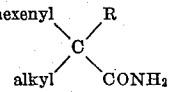

wherein R represents a CN and CONH$_2$ group, with hypohalogenides in presence of an alkali and water, new 5.5-cyclohexenylalkylhydantoins of the general formula:

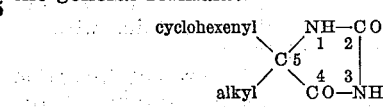

can be obtained.

The 5,5 - cyclohexenylalkylcyanoacetic- and -malonic acid derivatives that are used as starting products in the present process can be prepared for instance by treating Δ-1,2-cyclohexenylalkylcyanoacetic acid ester with ammonia, whereby Δ-1,2-cyclohexenylalkylcyanoacetamides will be obtained, which yield on treatment with hypohalogenides in presence of an alkali and water the desired hydantoins.

The treatment of the compounds of the general formula:

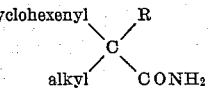

wherein R represents a CN and CONH$_2$ group with hypohalogenides in order to obtain the hydantoin derivatives can be carried out at a temperature of 0° to 100° C. preferably at 10°–60° C. This treatment is generally carried out with aqueous solutions of alkalimetalhypohalogenides such as sodium and potassium hypochlorites or hypobromites, whereby also mixtures of different hypohalogenides such as a mixture of sodium hypobromite and calcium hypobromite can be used.

The concentration of the hypohalogenide solution may vary within wide limits, but it is advisable to employ 10 to 30% solutions of freshly prepared hypohalogenides. The treatment with hypohalogenides is preferably carried out in presence of a water soluble alkaline compound, such as sodium and potassium hydroxides, carbonates and bicarbonates, but it is also possible to use as acid binding agent earth alkalimetal carbonates and hydroxides in admixture with the above cited water soluble alkaline compounds.

The hydantoins prepared as above described generally remain dissolved in the aqueous solution if an excess of alkali is present therein, as they form water soluble alkalimetal salts. They can therefore be isolated in form of free hydantoins by treating their aqueous alkaline solutions with acids, or they can be isolated as alkalimetal salts by adding to their solution a sufficient amount of an organic solvent or a mixture of organic solvents such as methanol, ethanol or mixtures of these solvents with ether, chloroform and the like.

The 5,5-cyclohexenylalkylhydantoins prepared in this manner possess the general formula:

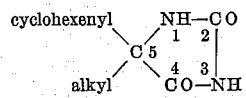

in which the term cyclohexenyl represents a cyclohexenyl group such as the Δ-1,2-cyclohexenyl-, the Δ-2,3-cyclohexenyl-, the 4-methyl- Δ-1,2 cyclohexenyl group. The term alkyl represents a saturated or an unsaturated alkyl-group such as methyl, ethyl, propyl, butyl, allyl, bromallyl. These compounds are white tasteless and odourless crystalline products, easily soluble in organic solvents. They yield easily water soluble alkalimetal salts and can be used as free hydantoins or as their water soluble salts for therapeutical application.

By treating the 5,5-cyclohexenylalkylhydantoins with alkylating and aralkylating agents, they become transformed into their mono- or di-N-alkyl- or N-aralkyl derivatives, which also represent valuable products for therapeutical application.

These mono- or di-N-alkyl- or -aralkyl derivatives of 5,5-cyclohexenylalkylhydantoins are preferably prepared by direct alkylation or aralkylation of 5,5-cyclohexenylalkylhydantoins by means of a treatment of these compounds with alkylating agents such as halogen-alkyls, dialkylsulphates, toluenesulphonic acid esters, or aralkylhalogenides, such as for instance ethyl-bromide, methylchloride, dimethylsulphate, p-toluene-sulphonic acid propylester, benzylchloride, nitrobenzylchloride.

By means of this treatment a first alkyl or aralkyl group is introduced into the nitrogen atom in position 3, whilst only later a second alkyl or aralkyl group is introduced into the nitrogen atom in position 1. This different reactibility of the nitrogen atoms affords the possibility of introducing different alkyl or aralkyl groups into the hydantoin ring.

The alkylation or aralkylation of 5,5-cyclohexenylalkylhydantoins may be carried out in a solvent or in presence of a diluting agent, whereby water, methanol, ethanol, acetone, ether or benzene can be used.

It is preferable to carry out the alkylation or aralkylation process in presence of acid binding agents such as sodium carbonate, sodium bicarbonate, sodium hydroxide, calcium carbonate or hydroxide, or organic bases such as pyridine, quinoline, dimethylaniline.

This process may further be carried out in open or closed vessels; sometimes it is advantageous to work under pressure and at temperatures up to 150° C. But generally it is possible to carry out the alkylation or aralkylation already at lower temperatures say from 20° C. upward. The temperature of alkylation is dependent of the alkylating or aralkylating agents used; some of them react already at low, others only at a higher temperature.

Further it is preferable to carry out the process under good stirring in order to obtain an intimate contact of the different products brought to reaction.

The new mono- or di-N-alkyl- or aralkyl- or N-alkyl-N-aralkyl - 5,5 - cyclohexenylalkylhydantoins prepared in this manner possess the general formula:

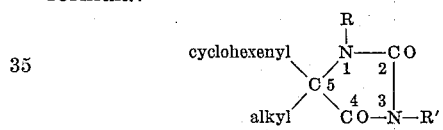

wherein R' represents an alkyl or a benzyl group and R represents hydrogen, an alkyl or a benzyl group, whereby R' and R can be the same or different groups such as methyl, ethyl, propyl, butyl, isobutyl, allyl, bromallyl, benzyl, nitrobenzyl and halogenbenzyl.

In the dry state they are colorless, crystallized compounds without smell and taste. Generally they are easily soluble in ethanol, methanol, acetone, chloroform, difficultly soluble in cold, but soluble to some extent in hot water.

The 3-alkyl- and aralkyl-5,5-cyclohexenylalkylhydantoins are soluble in sodium hydroxide solutions, whereas the N-dialkyl- or -aralkyl derivatives are no more soluble therein.

All of the 5,5-cyclohexenylalkylhydantoins prepared as hereinabove described behave as unsaturated compounds on treatment with bromine or potassium permanganate.

In order to prepare the water-soluble alkalimetal salts of the 5,5-cyclohexenylalkylhydantoins and their N-monoalkyl- or -aralkyl derivatives, the free hydantoins are for example dissolved in a suitable organic solvent such as ethanol and treated with an equivalent quantity of sodium or potassium alcoholate, whereby the sodium or potassium salts of the hydantoin separate generally in a crystalline form. By filtration and washing with ethanol and ether, they can be obtained in a very pure form. It is obvious that the same salts can also be prepared by dissolving the above named hydantoins in a solution of sodium or potassium hydroxide and by evaporation of the solution preferably in vacuo, or by adding to this solution a certain amount of a suitable organic solvent, such as methanol or ethanol, whereby the salts become precipitated and can be separated in the usual manner.

The alkalimetal salts of the 5,5-cyclohexenylalkylhydantoins and of their N-monoalkyl- or -aralkyl derivatives are colourless compounds, which can be used for therapeutical purposes.

An object of the present invention is therefore a process for the manufacture of 5,5-cyclohexenylalkylhydantoins characterized in that compounds of the general formula:

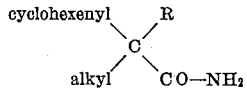

wherein R represents a CN and CONH₂ group, are treated with hypohalogenides in presence of alkali and water.

A further object of the present invention is a process for the manufacture of N-mono- and dialkyl- or aralkyl- or N-alkyl-N-aralkyl-5,5-cyclohexenylalkylhydantoins of the general formula:

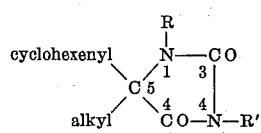

wherein R and R' represent alkyl and benzyl groups and wherein R can also represent a hydrogen, which is characterized in that 5,5-cyclohexenylalkylhydantoins are treated with alkylating and aralkylating agents.

A further object of the present invention is a process for the manufacture of water-soluble salts of the 5,5-cyclohexenylalkylhydantoins and their N-monoalkyl- of benzyl derivatives, consisting in treating the said hydantoins with an alkali of the alkalimetal series.

Still another object of the present invention are the 5,5-cyclohexenylalkylhydantoins of the general formula:

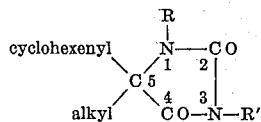

wherein R and R' represent hydrogen, alkyl- and benzyl groups, whereby if R' represents hydrogen, R must also represent hydrogen, said products being colourless compounds without smell and taste, soluble in methanol, ethanol, acetone and chloroform and, when R represents hydrogen, also soluble in aqueous alkaline solutions yielding water-soluble alkalimetal salts.

Still another object of the present invention are the water-soluble alkalimetal salts of the 5,5-cyclohexenylalkylhydantoins and their 3-alkyl- or benzyl compounds.

The following examples, without being limitative, illustrate the present process, the parts being by weight or by volume.

*Example 1*

35.6 gr. of Δ-1,2-cyclohexenylmethylcyanoacetamide are introduced at 10° C. into a sodium hypobromite solution prepared from 11 ccm. of bromine and 200 ccm. of a 20% aqueous sodium hydroxide solution. After the solubilization of the compound has occurred, the solution is heated half an hour on the steam bath, allowed to cool down and diluted with 200 ccm. of water. After addition of some sodium bisulphite solution in order to eliminate the excess of hypobromite, the solution is acidulated with hydrochloric acid, whereby the 5,5-(Δ-1,2)-cyclohexenylalkylhydantoin precipitates with a nearly quantitative yield. By recrystallization from hot water the new compound will be obtained in form of long colourless needles of M. P. 163–165° C. It is easily soluble in ethanol, acetone, chloroform, ether, difficultly soluble in cold, but easier in hot water. It is soluble in aqueous solutions of alkalimetal hydroxides and carbonates, yielding water soluble alkalimetal salts, and can be precipitated therefrom in an unaltered form on addition of an acid. Potassium permanganate and bromine solutions become decolored on addition of the compound, which indicates its unsaturated character.

0.2457 gr. thereof use according to the Kjeldahl method 25.34 ccm. of $\frac{1}{10}$-n-$H_2SO_4$, which represents for the compound of the formula $C_{10}H_{14}O_2N_2$ a nitrogen content of:

N=14.43% calculated;
N=14.45% found.

*Example 2*

If in the preceding example the $\Delta$-1,2-cyclohexenylmethylcyano-acetamide is replaced by the equivalent quantity of $\Delta$-1,2-cyclohexenylethylcyano-acetamide (38.4 gr.), while otherwise there is proceeded as above described, the 5,5-($\Delta$-1,2)-cyclohexenylethylhydantoin will be obtained. The same gives colourless crystals of M. P. 194–196° C. and is easily soluble in ethanol, acetone, chloroform, more difficultly in ether and difficultly soluble in petrol ether. The new compound is also difficultly soluble in hot and in cold water, but easily soluble in sodium carbonate or hydroxide solutions. If treated as aqueous suspension with potassium permanganate it becomes immediately oxidized.

0.3807 gr. of the substance use according to the Kjeldahl method 36.04 ccm. $\frac{1}{10}$-n-$H_2SO_4$, which represents for the formula $C_{11}H_{16}O_2N_2$ a nitrogen content of:

N=13.46% calculated;
N=13.26% found.

*Example 3*

By replacing the $\Delta$-1,2-cyclohexanylmethylcyano-acetamide used in the Example 1 by an equivalent quantity of $\Delta$-1,2-cyclohexenylallylcyano-acetamide (40.8 gr.) and working as therein described, the 5,5-($\Delta$-1,2)-cyclohexenylallylhydantoin will be obtained nearly with a quantitative yield. This compound crystallizes in form of colorless prismatic crystals of M. P. 178–179° C. and is easily soluble in ethanol, methanol, acetone, chloroform, more difficultly soluble in benzene and ether, difficultly soluble in petrol ether. It is also difficultly soluble in cold, but is soluble to some extent in hot water. In presence of sodium carbonate and hydroxide it is easily soluble in water yielding the sodium salt. In aqueous suspension it is immediately oxidized by potassium permanganate and on treatment with bromine it adds bromine very rapidly.

*Example 4*

19.4 gr. of 5,5-($\Delta$-1,2)-cyclohexenylmethylhydantoin are dissolved in 200 ccm. of water and 11.0 ccm. of a sodium hydroxide solution of 40%, warmed up to 55° C. and treated under good stirring with 14.0 gr. of dimethylsulphate. The methylation product precipitates very rapidly from the solution, is isolated by filtration and recrystallized from dilute ethanol. The 3-methyl-$\Delta$-1,2-cyclohexenylmethylhydantoin thus obtained crystallizes in form of long colorless needles of M. P. 148–149° C. It is easily soluble in ethanol, chloroform, ethylacetate, more difficultly in ether, difficultly soluble in petrol ether. It is nearly insoluble in sodium hydroxide solutions. Towards bromine and potassium permanganate it behaves as an unsaturated compound.

0.3024 gr. of this compound use according to the Kjeldahl method 29.10 ccm. of $\frac{1}{10}$-n-$H_2SO_4$, for $C_{11}H_{16}O_2N_2$:

N=13.46% calculated;
N=13.48% found.

If instead of dimethylsulphate an equivalent quantity of ethylbromide or allylbromide or benzylchloride is employed and the treatment is carried out in an ethanol solution, the respective 3-ethyl- or -allyl- or -benzyl compounds will be obtained.

*Example 5*

By replacing in the Example 4 the 5,5-($\Delta$-1,2)-cyclohexenylmethylhydantoin by the equivalent quantity of 5,5-($\Delta$-1,2)-cyclohexenylethylhydantoin (20.8 gr.) the respective 3-methyl-5,5-($\Delta$-1,2)-cyclohexenylethylhydantoin will be obtained. It crystallizes in form of colourless thin needles of M. P. 108–109° C., is easily soluble in ethanol, chloroform, ethylacetate, ether, difficultly soluble in petrol ether, nearly insoluble in water and difficultly soluble in dilute sodium hydroxide solutions. Towards potassium permanganate and bromine it behaves as an unsaturated compound.

0.2683 gr. of the substance use by the Kjeldahl method 24.76 ccm. of $\frac{1}{10}$-n-$H_2SO_4$ for $C_{12}H_{18}O_2N_2$:

N=12.61% calculated;
N=12.93% found.

*Example 6*

20.8 gr. of 3-methyl-5,5-($\Delta$-1,2)-cyclohexenylmethylhydantoin are dissolved in 150 ccm. of ethanol and 15.0 ccm. of a sodium hydroxide solution and treated at 60–70° C. under good stirring with 19.5 gr. of dimethylsulphate. The reaction mixture must react weakly alkaline at the end of the methylation. After standing for about an hour, the ethanol is evaporated in vacuo and the residue mixed with water, whereby an oily substance, that becomes hard after a certain time, will be obtained. This crystalline mass is then separated, ground with water, filtered and dried. By recrystallization from petrol ether the 1,3-dimethyl-5,5-($\Delta$-1,2)-cyclohexenylmethylhydantoin will be obtained in form of colourless columns of M. P. 64–66° C. It is very easily soluble in ethanol, chloroform, ethylacetate, ether, more difficultly soluble in petrol ether and very difficultly soluble in water. Towards bromine and potassium permanganate it behaves as an unsaturated compound.

0.6096 gr. of the substance use by the Kjeldahl method 55.31 ccm. of $\frac{1}{10}$-n-$H_2SO_4$ for $C_{12}H_{18}O_2N_2$:

N=12.61% calculated;
N=12.71% found.

The same compound will also be obtained by methylating the 5,5-($\Delta$-1,2)-cyclohexenylmethylhydantoin in an aqueous or ethanol solution in the manner described in Example 4, but using a 2½ times greater quantity of sodium hydroxide and of dimethylsulphate.

By using in this example instead of dimethylsulphate an equivalent quantity of ethylbromide or allylbromide or benzylchloride the respective 3-methyl-1-ethyl- or -allyl- or -benzyl compounds will be obtained.

*Example 7*

In the same manner as described in Example 6 the 3-methyl-5,5-(Δ-1,2)-cyclohexenylethylhydantoin (22.3 gr.) can be transformed into the 1,3-dimethyl-5,5-(Δ-1,2)-cyclohexenylethylhydantoin. This compound crystallizes in form of colourless plates of M. P. 65–67° C. It is very easily soluble in ethanol, acetone, ethylacetone, chloroform, soluble in ether and petrol ether, but insoluble in water. Towards bromine and potassium permanganate it behaves as an unsaturated compound.

0.5065 gr. of the substance use by the Kjeldahl method 42.49 ccm. of 1/10-n-H₂SO₄ for $C_{10}H_{20}O_2N_2$:

$N = 11.86\%$ calculated;
$N = 11.75\%$ found.

This compound can also be prepared in one operation by direct methylation of 5,5-(Δ-1,2-)-cyclohexenylethylhydantoin in an aqueous or alcoholic solution if greater quantities of the methylating agent are used.

What I claim is:—

1. A process for the manufacture of 5,5-(Δ-1,2)-cyclohexenylalkylhydantoins, comprising treating the compounds of the general formula:

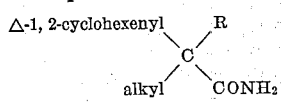

wherein the term alkyl represents one of the group consisting of saturated and unsaturated alkyl radicals and R represents one of the group consisting of CN and CONH₂ radicals, with hypohalogenides in presence of water and of an alkali.

2. A process for the manufacture of 5,5-(Δ-1,2)-cyclohexenylalkylhydantoins, comprising treating the compounds of the general formula:

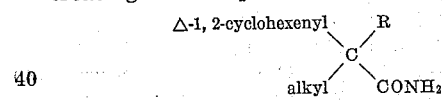

wherein the term alkyl represents one of the group consisting of saturated and unsaturated alkyl radicals and R represents one of the group consisting of CN and CONH₂ radicals, with hypohalogenides in presence of water and of an alkali at a temperature of 0° to 100° C.

3. A process for the manufacture of 5,5-(Δ-1,2)-cyclohexenylalkylhydantoins, comprising treating the compounds of the general formula:

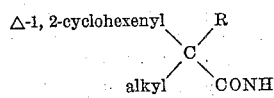

wherein the term alkyl represents one of the group consisting of saturated and unsaturated alkyl radicals and R represents one of the group consisting of CN and CONH₂ radicals, with hypohalogenides in presence of water and of an alkali at a temperature of 0° to 100° C. and subjecting the 5,5-Δ-1,2-cyclohexenylalkylhydantoins thus obtained to a treatment with compounds capable of substituting the imino groups of the hydantoin ring and selected from the class consisting of alkylating and benzylating agents, this treatment being carried out in presence of solvents and acid binding agents at a temperature of 10° to 150° C.

4. A process for the manufacture of 5,5-(Δ-1,2)-cyclohexenylalkylhydantoins, comprising treating the compounds of the general formula:

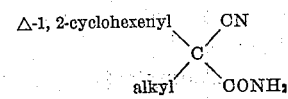

wherein the term alkyl represents one of the group consisting of saturated and unsaturated alkyl radicals, with hypohalogenides in presence of water and of an alkali.

5. A process for the manufacture of 5,5-(Δ-1,2)-cyclohexenylalkylhydantoins, comprising treating the compounds of the general formula:

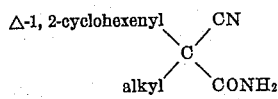

wherein the term alkyl represents one of the group consisting of saturated and unsaturated alkyl radicals, with sodium hypobromite in an aqueous medium and in presence of sodium hydroxide at a temperature of 0° to 100° C.

6. A process for the manufacture of 5,5-(Δ-1,2)-cyclohexenylmethylhydantoin, comprising treating Δ-1,2-cyclohexenylmethylcyanoacetamide with sodium hypobromite in an aqueous solution and in presence of sodium hydroxide.

7. A process for the manufacture of 5,5-(Δ-1,2)-cyclohexenylethylhydantoin, comprising treating Δ-1,2-cyclohexenylmethylcyano-acetamide with sodium hypobromite in an aqueous solution and in presence of sodium hydroxide.

8. A process for the manufacture of 5,5-(Δ-1,2)-cyclohexenylallylhydantoin, comprising treating Δ-1,2-cyclohexenylallylcyano-acetamide with sodium hypobromite in an aqueous solution and in presence of sodium hydroxide.

9. The Δ-1,2-cyclohexenylalkylhydantoins of the general formula:

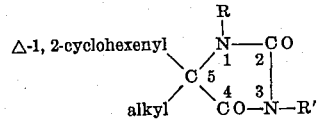

wherein the term alkyl represents one of the group consisting of saturated and unsaturated alkyl radicals and wherein R and R' represent one of the group consisting of hydrogen, alkyl and benzyl, whereby if R' represents hydrogen, R must also represent hydrogen, said products being colourless compounds without smell and taste, soluble in methanol, ethanol, acetone and chloroform and, when R represents hydrogen, also soluble in aqueous solutions yielding water soluble alkalimetal salts.

10. The 5,5-(Δ-1,2)-cyclohexenylmethylhydantoin, which is a colourless crystallized compound without smell and taste, melting at 163–165° C., easily soluble in ethanol, acetone, chloroform and ether, soluble in hot water and in aqueous alkaline solutions yielding water soluble alkalimetal salts.

11. The 5,5-(Δ-1,2)-cyclohexenylethylhydantoin, which is a colourless crystallized compound without smell and taste, melting at 194–196° C., easily soluble in ethanol, acetone, chloroform and ether, soluble in hot water and in aqueous alkaline solutions yielding water soluble alkalimetal salts.

12. The 5,5-(Δ-1,2)-cyclohexenylallylhydantoin, which is a colourless crystallized compound without smell and taste, melting at 178–179° C., easily soluble in ethanol, acetone, chloroform and ether, soluble in hot water and in aqueous alkaline solutions yielding water soluble alkalimetal salts.

AUGUST BINKERT.